US008967285B2

(12) United States Patent
Hill

(10) Patent No.: US 8,967,285 B2
(45) Date of Patent: Mar. 3, 2015

(54) METHOD AND APPARATUS TO COLLECT CORES FROM GOLF GREEN

(71) Applicant: James E Hill, Waddell, AZ (US)

(72) Inventor: James E Hill, Waddell, AZ (US)

(*) Notice: Subject to any disclaimer, the term of this patent is extended or adjusted under 35 U.S.C. 154(b) by 0 days.

(21) Appl. No.: 13/999,164

(22) Filed: Jan. 22, 2014

(65) Prior Publication Data

US 2014/0251645 A1 Sep. 11, 2014

Related U.S. Application Data

(63) Continuation-in-part of application No. 13/199,261, filed on Aug. 24, 2011, now Pat. No. 8,662,193.

(51) Int. Cl.
*A01B 45/00* (2006.01)
*A01B 45/02* (2006.01)

(52) U.S. Cl.
CPC .................................... *A01B 45/02* (2013.01)
USPC ............................................ 172/21; 172/272

(58) Field of Classification Search
USPC .......... 172/21, 22, 172, 439; 15/257.1, 340.1; 294/50.9; 171/63
See application file for complete search history.

(56) References Cited

U.S. PATENT DOCUMENTS

| | | | | |
|---|---|---|---|---|
| 2,545,739 A * | 3/1951 | Martin | ............................ | 37/408 |
| 2,704,018 A * | 3/1955 | Oehler et al. | ................. | 172/441 |
| 3,429,378 A * | 2/1969 | Mascaro | .......................... | 172/22 |
| 3,542,135 A * | 11/1970 | McCanse | ....................... | 172/319 |
| 3,797,578 A * | 3/1974 | Velasquez | ....................... | 172/22 |
| 4,884,637 A * | 12/1989 | Rohleder | ......................... | 172/22 |
| 5,069,293 A * | 12/1991 | St. Romain | ..................... | 172/22 |
| 5,305,834 A * | 4/1994 | White | .............................. | 171/63 |
| 5,423,386 A * | 6/1995 | Lapearous | ....................... | 172/22 |
| 6,092,607 A * | 7/2000 | Bercheny et al. | ................ | 171/63 |
| 6,253,858 B1 * | 7/2001 | Warke | .............................. | 172/22 |
| 6,321,849 B1 * | 11/2001 | Underhill | ......................... | 172/22 |
| 6,550,705 B2 * | 4/2003 | Pfisterer | ................... | 241/101.76 |
| 6,805,205 B1 * | 10/2004 | Gabard | ........................... | 172/22 |
| 6,986,393 B1 * | 1/2006 | Johnston et al. | ................ | 172/21 |
| 7,066,275 B1 * | 6/2006 | Keigley | ........................... | 171/63 |

* cited by examiner

*Primary Examiner* — Jamie L McGowan
(74) *Attorney, Agent, or Firm* — Tod R. Nissle, P.C.

(57) ABSTRACT

A method to collect soil cores from a green comprises the steps of providing a soil core collector, extracting soil cores from a green, allowing the cores to dry for at least fifteen minutes, and utilizing the core collector to gather the cores from the green.

1 Claim, 14 Drawing Sheets

METHOD AND APPARATUS TO COLLECT CORES FROM GOLF GREEN

This application claims priority based on U.S. patent application Ser. No. 13/199,261 filed Aug. 24, 2011.

This invention relates to a soil core collector.

A variety of equipment and procedures have existed for the purpose of removing soil cores from a golf green. There has long existed a motivation to improve such existing systems.

Therefore, it is a principal object of the instant invention to provide an improved system and apparatus to collect soil cores from a golf green or other area of ground.

This and other, further and more specific objects and advantages of the invention will be apparent to those skilled in the art from the following detailed description thereof, taken in conjunction with the drawings, in which.

Figure 1:
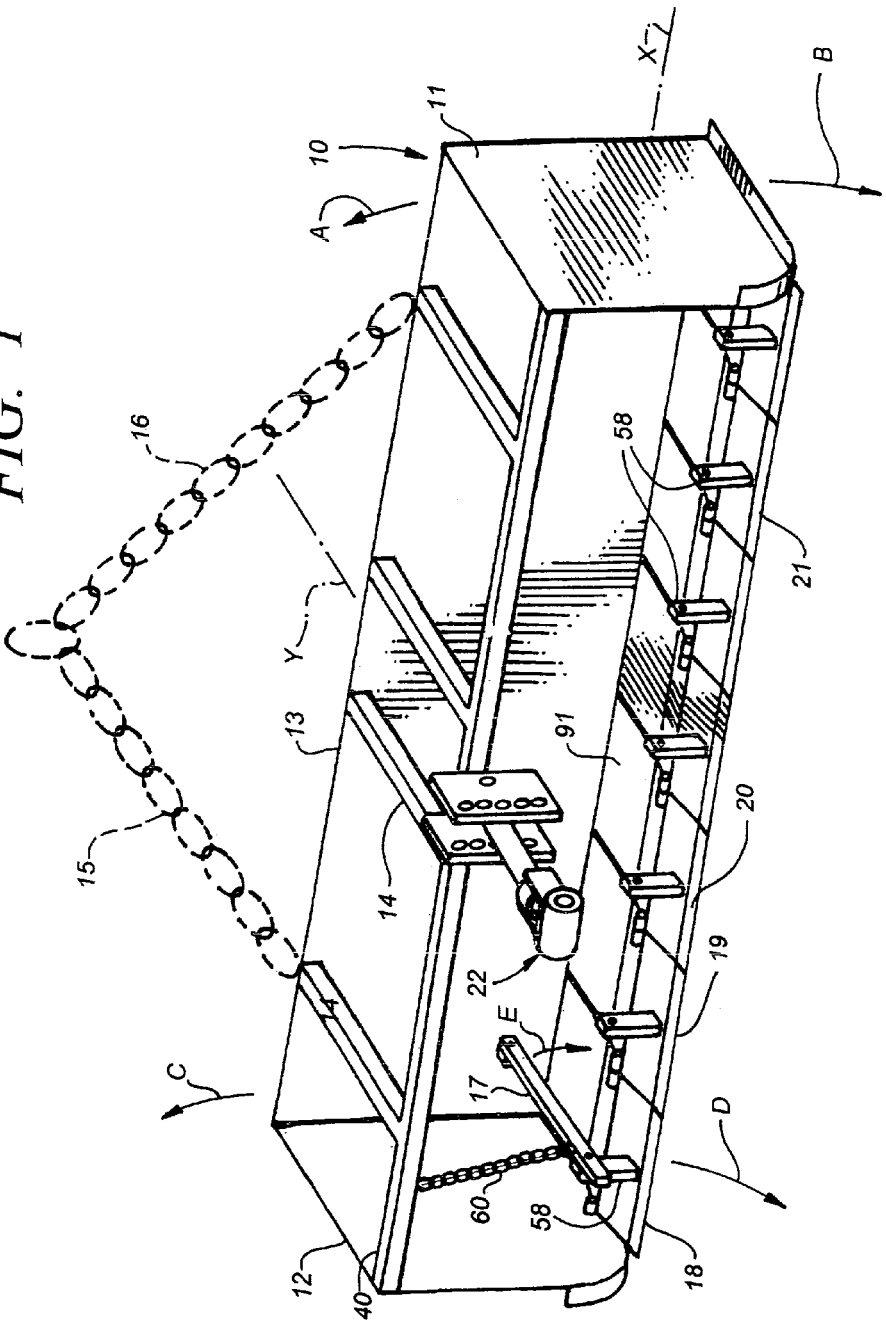
FIG. 1 is a perspective view illustrating a soil core collector sled constructed in accordance with the principles of the invention.

Briefly, in accordance with the invention, provided is an improved method to collect soil cores from the surface of a golf green. The method includes the step of providing soil core collector apparatus. The soil core collector apparatus includes a prime mover. The prime mover has a selected weight and at least three ground engaging tires, each of said tires having a selected tread diameter, width, and ground contact area such that said prime mover generates less than one hundred psi on the surface of the golf green. The prime mover has a top speed of at least five miles per hour. The soil core collector apparatus also includes a soil core collector sled attached to the prime mover. The soil core collector sled includes a housing, and a plurality of contiguous linked shovels. Each shovel is shaped and dimensioned to contact and slide over the surface of the green, and includes a leading portion shaped and dimensioned to lie, when the shovel sets on the surface of the green, flat on the surface of the green. The leading portion includes a leading edge with a squared off surface canted with respect to the surface of the green when the shovel sets on the surface of the green, and includes a trailing portion connected to the leading portion and shaped and dimensioned to cant, when the shovel sets on the surface of the green, upwardly away from the leading portion and the surface of the green at an angle of less than nine degrees. The soil core collector sled has at least two operative positions on the prime mover, a first deployed operative position with the shovels set on the surface of the green such that the prime mover can pull the sled over the surface of the green to collect soil cores, and a second stowed position with the sled raised away from the surface of the green. The improved method also includes the steps of aerating the green by extracting soil cores from the green and leaving the extracted soil cores scattered on the surface of the green; waiting at least fifteen minutes for the extracted soil cores to dry; positioning the soil core collector sled in the first deployed operative position; and, moving the prime mover and the soil core collector sled over the surface of the green at at least five mph to collect the extracted soil cores from the surface of the green.

In another embodiment of the invention, an improved method is provided to collect soil cores from the surface of a golf green. The method comprises the step of providing soil core collector apparatus. The core collector apparatus includes a prime mover. The prime mover has a selected weight and at least three ground engaging tires, each of the tires having a selected tread diameter, width, and ground contact area such that the prime mover generates less than two hundred psi on the golf green, and a top speed of at least five miles per hour. The core collector apparatus also includes a soil core collector sled. The sled comprises a housing including a pair of spaced apart upright sides; a front generally horizontally oriented panel member extending between and generally perpendicular to the sides; a rear upright panel member generally parallel to the front panel member and extending between and generally perpendicular to the sides; and a plurality of contiguous linked shovels extending between the sides and shaped and dimensioned to contact and slide over the surface of the green. Each of the shovels includes a leading portion shaped and dimensioned to lie, when the shovel sets on the surface of the green, flat on the surface of the green. The leading portion includes a leading edge with a surface canted with respect to the surface of the green when the shovel sets on the surface of the green. Each of the shovels also includes a trailing portion connected to the leading portion and shaped and dimensioned to cant, when the shovel sets on the surface of the green, upwardly away from the leading portion and the surface of the green at an angle of less than nine degrees. The core collector apparatus also includes a hitch assembly interconnecting the prime mover and the soil collector sled. The hitch assembly includes a yoke (123) connected to the prime mover; a pivot sleeve (141) interconnecting the yoke and the front panel member (140) such that the sled can pivot with respect to the yoke about a generally horizontally oriented axis (X2) which is generally perpendicular to the front panel; an upright member (114) connected to and upwardly depending from the yoke; a support member (118) connected to the upright member and extending over the sled; and, a spring assembly (133, 134, 154) interconnecting the support member (118) and the rear panel member of the sled to generate a force acting to displace the rear panel member and sled downwardly toward the ground. The soil core collector sled has at least two operative positions with respect to the prime mover, a first deployed operative position with the shovels set on the surface of the green such that the prime mover can pull the sled over the surface of the green to collect soil cores, and a second stowed position with the sled raised away from the surface of the green. The method also includes the steps of aerating the green by extracting soil cores from the green and leaving the extracted soil cores scattered on the surface of the green; positioning the soil core collector sled in the first deployed operative position; and, moving the prime mover and the soil core collector sled over the surface of the green to collect the extracted soil cores from the surface of the green.

Figure 2:
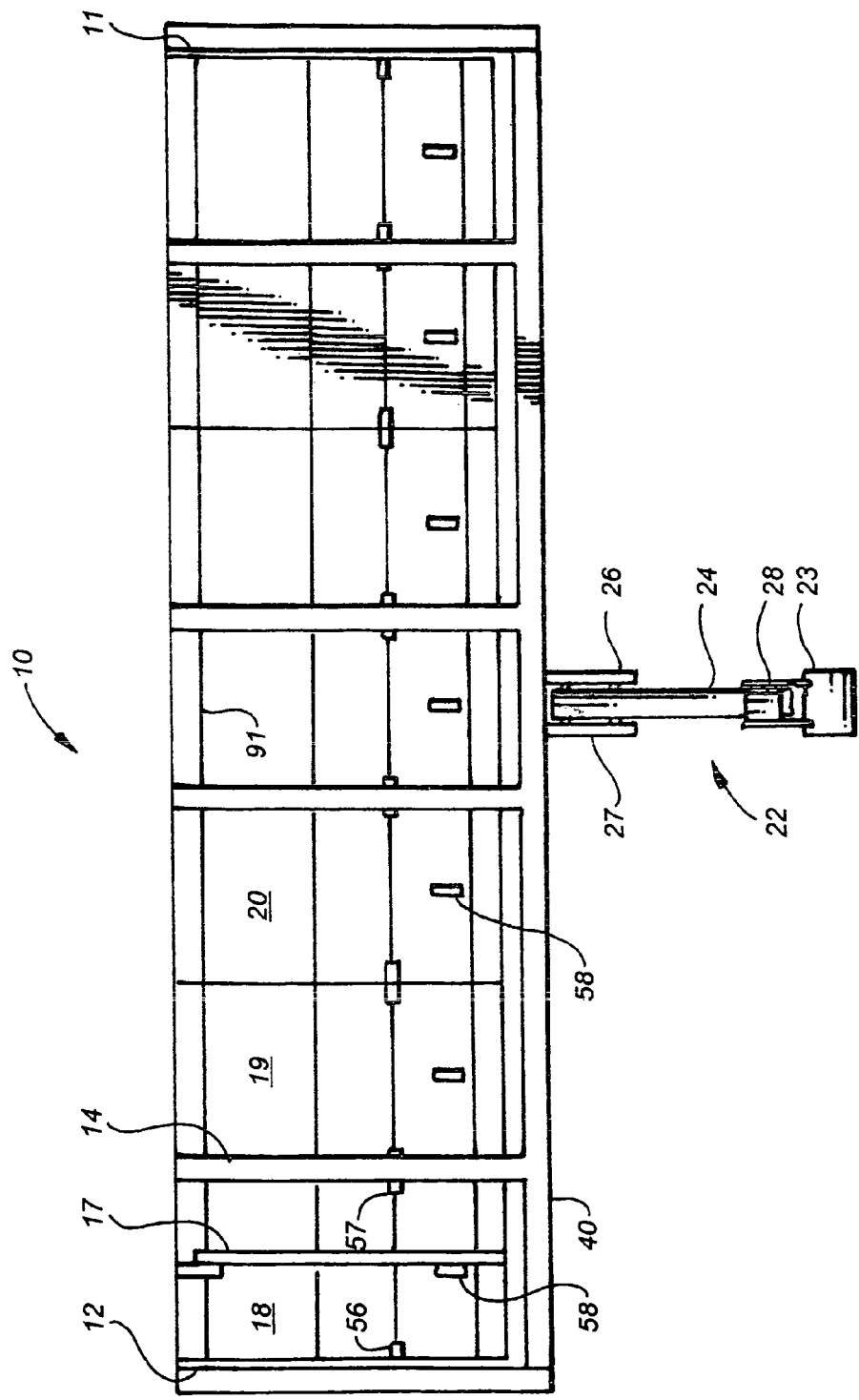
FIG. 2 is a top view illustrating the soil core collector sled of FIG. 1.

Turning now to the drawings, which depict the presently preferred embodiments of the invention for the purpose of illustrating the practice thereof and not by way of limitation of the scope of the invention and in which like reference characters refer to corresponding elements throughout the several views, FIGS. 1 and 2 illustrate a soil core collector sled constructed in accordance with the principles of the invention and generally indicated by reference character 10. Sled 10 includes a housing with vertically oriented spaced apart sides 11 and 12, vertically oriented back 13 extending between and interconnecting sides 11 and 12, horizontally oriented support member 40 extending between and interconnecting sides 11 and 12, and spaced apart horizontally oriented ribs 14 extending between and interconnecting back 13 and support member 40. Plates 26, 27 (FIG. 2) of hitch assembly 22 are fixedly attached to member 40. Hitch assembly 22 is described in more detail below with reference to FIG. 5.

Contiguous shovels 18, 19, 20, 21 are loosely linked together such that the elevation of one shovel 18 can vary slightly with respect to the elevation of an adjacent shovel 19. This permits shovels 18 to 21 to adapt more readily to variations in the surface contour of a green. Such a "loose linkage" between adjacent shovels is explained in more detail below with reference to FIG. 3. The shape and dimension of one shovel 18 is equivalent to that of the remaining shovels 19 to 21, although that need not be the case.

Figure 6:
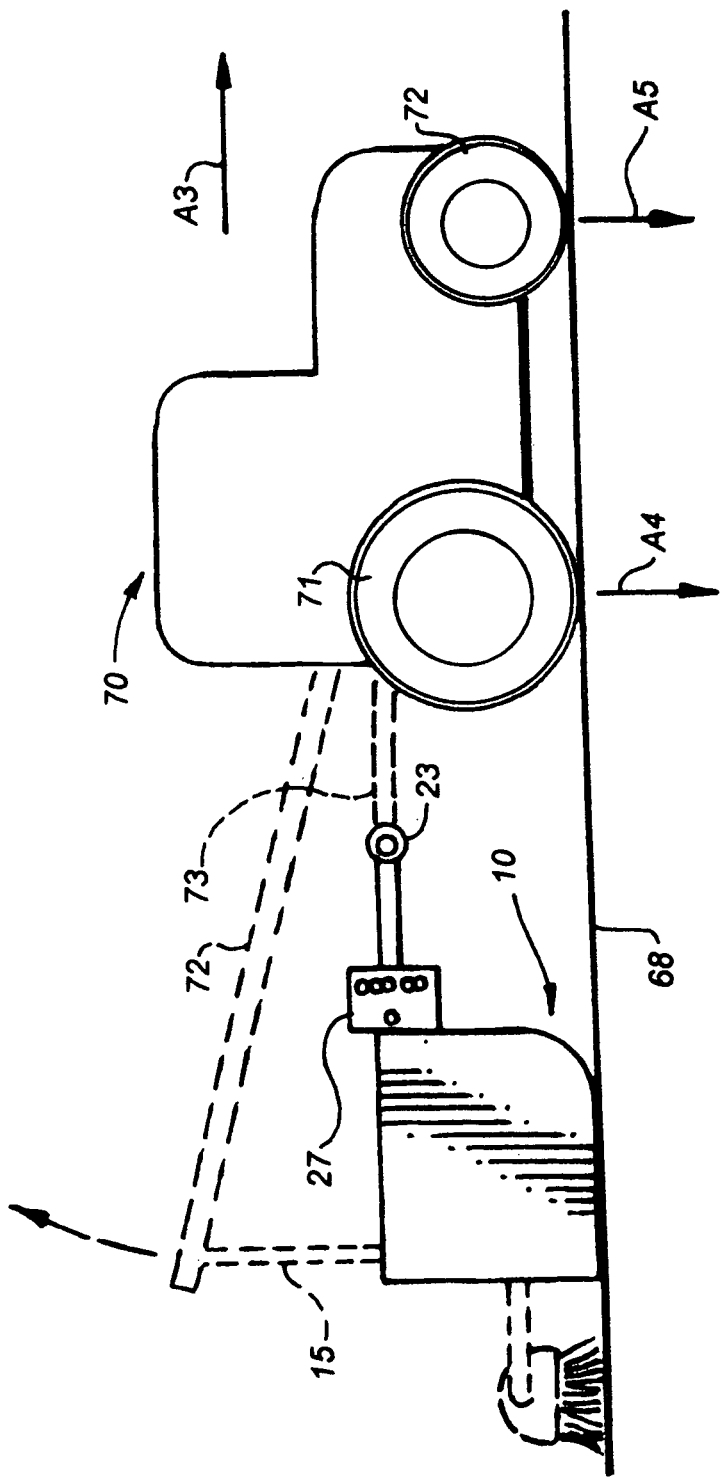
FIG. 6 is a side elevation view illustrating the mode of operation of the soil core collection system of the invention.
Figure 7:
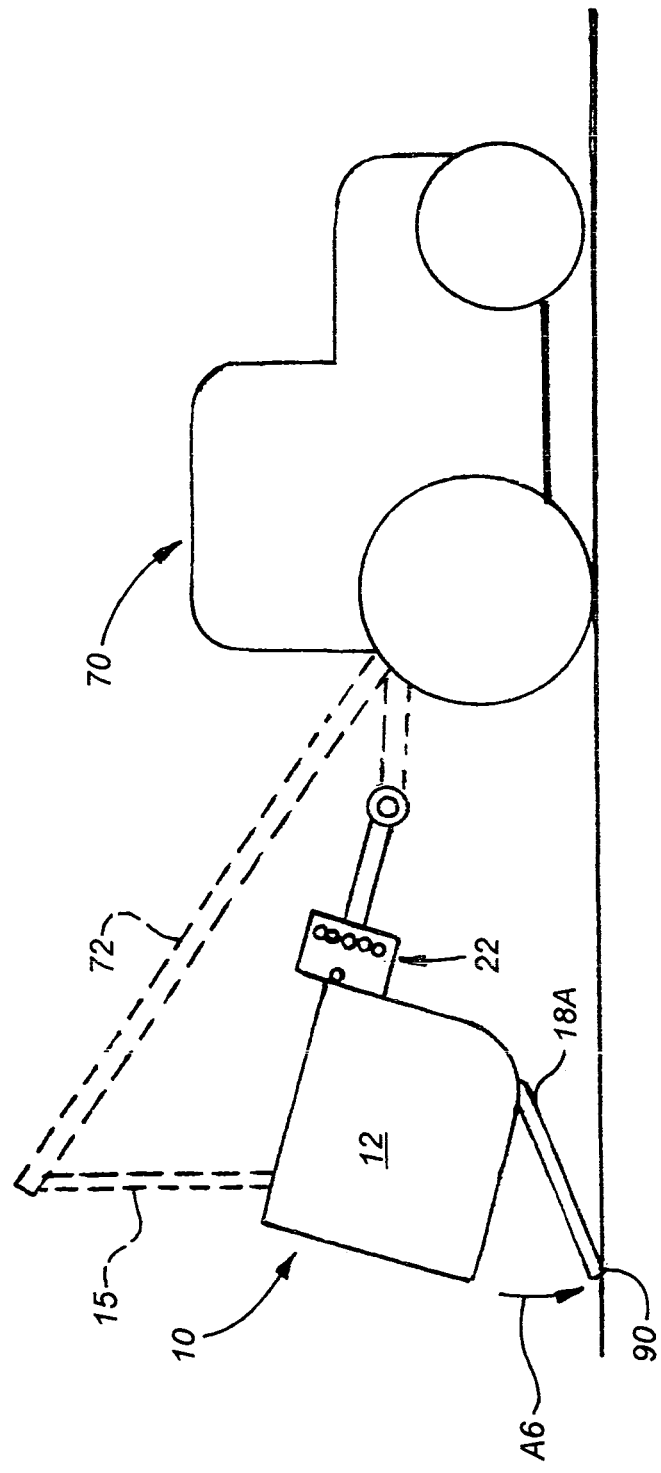
FIG. 7 is a side elevation view further illustrating the mode of operation of the soil core collection system of the invention.

Each shovel 18 to 21 includes an upstanding leg 58 fixedly connected to the top of the shovel. A support arm 17 includes a front end pivotally connected to leg 58 and another rear end pivotally connected to back 13. In FIGS. 1 and 2 only a single support arm 17 is, for *sake* of clarity, illustrated. The end of support arm 17 pivotally connected to leg 58 is also fixedly attached to the lower end of support chain 60. The upper end of chain 60 is fixedly connected to support member 40. FIGS. 1, 2, and 6 illustrate soil core collector sled 10 in a deployed operative position setting on the ground. FIG. 7 illustrates sled 10 in a stowed position in which a crane 72 attached to the rear of prime mover 70 is operated to lift sled 10 from its deployed operative position up away from the ground. When sled 10 is lifted off the ground from the deployed position of FIGS. 1, 2, 6, the rear end 90, 91 (FIGS. 1-4, 7) of each shovel 18 to 21 drops downwardly under gravity in the manner illustrated in FIG. 7. When rear end 90, 91 drops down, leg 58 pivots about the front end of support arm 17. Support arm 17 remains stationary because the front end of arm 17 is held in position by chain 60 and because the back end of arm 17 is secured to back 13.

Figure 3:
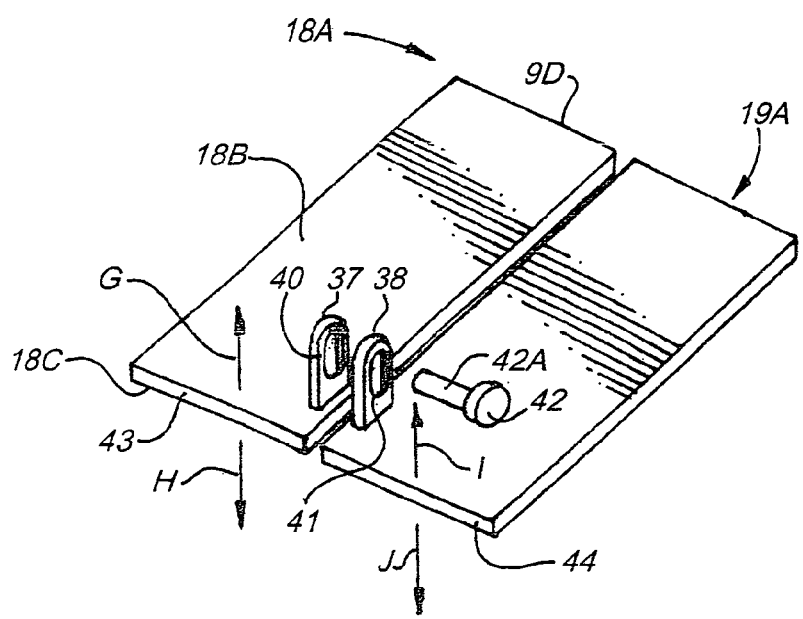
FIG. 3 is a perspective view illustrating a pair shovels which are loosely linked together and can be utilized in the soil core collector sled of FIG. 1.
Figure 4:
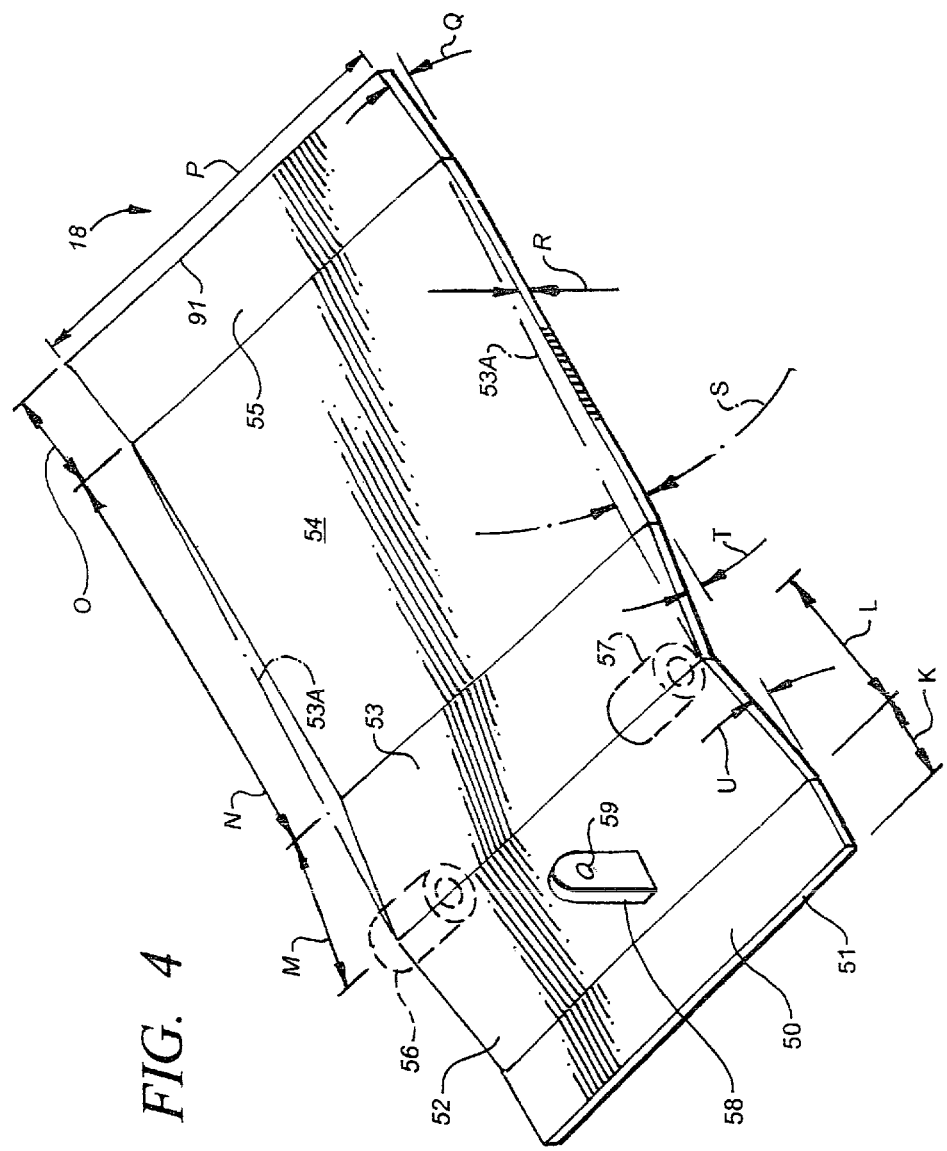
FIG. 4 is a perspective view illustrating alternate shovel constructions which can be utilized in the practice of the invention.

FIG. 3 illustrates in more detail the loose linkage between adjacent shovels 18A and 19A. Shovels 18A and 19A comprise flat rectangular plates. While shovels 18A and 19A can be utilized in the soil core collector sled 10 in the practice of the invention, shovels of the type illustrated in FIG. 4 are presently preferred. Upstanding legs 37 and 38 each are provided with an upwardly extending ovate opening 40 and 41, respectively. Openings 40 and 41 are sized such that the legs 42A of a fastener 42 will, when inserted through openings 40 and 41, slide a short distance upwardly or downwardly, as the case may be, in openings 40 and 41. This permits each shovel 18A to move or "float" upwardly (in the direction of arrow G) or downwardly (in the direction of arrow H), as appropriate, a short distance with respect to shovel 19A and facilitates the adaptation and conforming of shovels 18A and 19A to the undulations of a golf green. Similarly, shovel 19A can move or "float" upwardly (in the direction of arrow I) or downwardly (in the direction of arrow J) with respect to shovel 18A. Shovel 18A includes a squared off leading edge which includes rectangular surface 43 that is normal to the flat upper surface 18B and flat lower surface 18C of shovel 18A. Shovel 19A includes an equivalent surface 44. Surfaces 43 and 44 currently are, when shovels 18A and 19A rest on the generally horizontal surface of a golf green, normal to the surface of the green. Surfaces 43 and 44 can, however, be canted with respect to the horizontal surface of the green at angles other than ninety degrees. Such angles preferably are in the range of less than or equal to about thirty degrees forwardly or rearwardly from normal, preferably in the range of less than or equal to about fifteen degrees forwardly or rearwardly from normal. It is important in the practice of the invention to avoid turning the leading edge of a shovel 18A, 19A, 18 to 21 into a knife edge. Each surface 43, 44 presently is at least one-sixteenth of an inch, preferably at least one-eighth of an inch high, and, is no more than one-fourth of an inch high, preferably no more than three-sixteenths of an inch high.

The shovel 18 illustrated in FIG. 4 is shown in an orientation in which shovel 18 is setting on a horizontal green surface when sled 10 is in the deployed position of FIGS. 1 and 6. Shovel 18 includes hollow cylindrical members 56 and 57 which are fixedly secured to the top of shovel 18, and are shaped and dimensioned to function and provide "loose linkage" between shovels 18 to 21 in the same manner as that described with respect to legs 37 and 38 in FIG. 3.

Shovel 18 includes leading portion 50 which is parallel to and contacting the horizontal green surface. Rectangular surface 51 is perpendicular to the horizontal green surface. Leading portion 50 is connected to a first trailing portion 52. Portion 52 angles or cants upwardly away from portion 50 and from the horizontal green surface at an angle, indicated by arrows U, of less than nine degrees, preferably less than eight degrees, and most preferably less than seven degrees. Angle U is at least two degrees. A second trailing portion 53 cants downwardly away from portion 52 and is canted to the horizontal green surface at an angle, indicated by arrows T, of less than nine degrees, preferably less than eight degrees, and most preferably less than seven degrees. Angle T is at least two degrees. A third trailing portion 54 is parallel to and contacts the horizontal green surface. The thickness of portion 54 is indicated by arrows R and is presently generally equal to the thickness of the leading portion 50 and other trailing portions 52, 53, 55. The thickness R is presently preferably in the range of about one-sixteenth to one-fourth of an inch, preferably one-eighth to three-sixteenths of an inch. A fourth trailing portion 55 cants upwardly away from portion 54 and from the horizontal green surface at an angle, indicated by arrow Q, of less than nine degrees, preferably less than five degrees, and most preferably less than four degrees. Angle Q can be zero, but is preferably at least two degrees.

The width, indicated by arrow K, of leading portion 50 can vary as desired but is presently three-fourths of an inch. The width, indicated by arrows L, of the first trailing portion 52 can vary as desired, but is presently three and one-quarter inches. The width, indicated by arrows M, of the second trailing portion 53 can vary as desired, but is presently three and one-quarter inches. The width, indicated by arrows N, of the third trailing portion 54 can vary as desired, but is presently nine inches. The width, indicated by arrows S, of the fourth trailing portion 55 can vary as desired, but is presently one inch.

In an alternate embodiment of the invention, the second and third trailing portions 53, 54 are combined into a single trailing portion which extends along the dashed lines 53A in FIG. 4.

Utilizing a leading portion 50 which is, when sled 10 is in the deployed position, parallel to and contacting the ground, important because it generally prevents the leading surface 51 from digging into and damaging the surface of a green. Similarly, utilizing a trailing portion which is at an angle of nine degrees or less is important in minimizing the risk that surface 51 will dig into the surface of a green.

Figure 5:
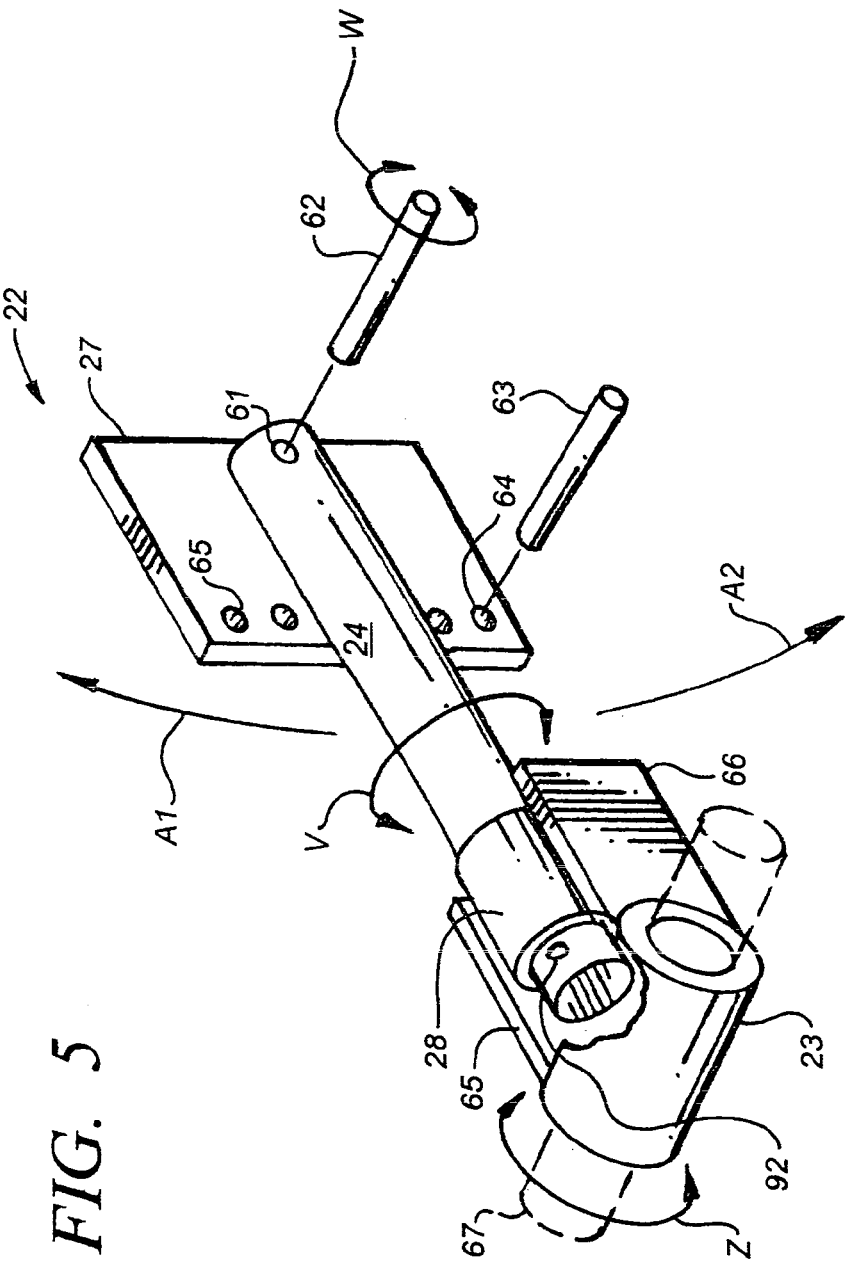
FIG. 5 is a perspective view illustrating a hitch assembly which can be utilized to secure adjustably the soil core collector sled to a prime mover.

Hitch assembly 22 is illustrated in greater detail in FIG. 5. Fixed plate 26 is omitted from FIG. 5 for the sake of clarity. Pin 62 extends through an aperture in plate 26 (not shown), through aperture 61 in arm 64, and through an aperture (not visible) in plate 27 such that arm 24 (and consequently sled 10) is free to pivot about pin 62 in the manner indicated by arrows W and A1 and A2. A pin 62 can be inserted through apertures in plates 26 and 27 and extend beneath (or above) arm 24 to serve as a stop which limits the distance that arm 24 can pivot in the direction of arrow A2 or arrow A1, as the case may be. Hollow cylindrical sleeve 28 is fixedly secured to plates 65 and 66, as is hollow cylindrical sleeve 23. One end of arm 24 slidably rotatably extends through sleeve 28. Once arm 24 is in the position illustrated in FIG. 5, a cotter pin is inserted through aperture 92 to prevent arm 24 from sliding out of sleeve 28. Arm 24 (and consequently sled 10) is, however, free to rotate in sleeve 28 in the directions indicated by arrows V. Sleeve 23 is slidably rotatably mounted on a member 67 which is removably fixedly secured to primer mover 70 so that sleeve 23 (and consequently sled 10) can rotate about member 67 in the manner indicated by arrows Z. The ability of portions of hitch member 22 to rotate in the manner described in this paragraph facilitates the ability of sled 10 to conform to contours in the surface of the green and, consequently, facilitates the ability of prime mover 70 to pull sled 10 over the surface of a green at relatively high rates of speed in excess of five mph or more.

The ability of sled 10, due to the construction of hitch assembly 22, to rotate about the Y axis in the manner indicated by arrows A and B is illustrated in FIG. 1. The ability of sled 10, due to the construction of hitch assembly 22, to rotate about the X axis in the manner indicated by arrows C and D is also illustrated in FIG. 1.

In FIG. 6, prime mover 70 includes a hoist assembly which can be utilized to lift sled off the surface of a green in the manner indicated in FIG. 7. The construction of prime mover 70 is important in the practice of the invention. In particular, before the surface of a green is aerate by removing soil plugs, the surface can typically support 350 to 550 psi. After soil cores are removed from the green, the green surface typically can only support 200 to 250 psi. If the weight of the prime mover is too great, which in the prior art is often the case, the wheels of the prime mover will form depressions in the green surface. During the process of developing the invention, a way was discovered to minimize or eliminate the risk that such depressions will be formed. Namely, a prime mover of the type utilized to treat sand traps is utilized, and the "knobby" wheels on such a prime mover are replaced with wheels having standard automobile wheel treads of the type illustrated in FIG. 8 and described below in more detail. One such prime mover is the Sand Pro™ 3050 (08703) sold by Toro and weighing 930 pounds. The Sand Pro has a ground speed in the range of zero to ten mph. The maximum ground speed of a Sand Pro is far is excess of the speed utilized with conventional coring equipment. When the Sand Pro is utilized in combination with tires of the type illustrated in FIG. 8, the Sand Pro typically generates fifty psi or less of pressure on the surface of a green. The Sand Pro is utilized only in combination with the soil core collector sled of the invention. Coring apparatus and/or other apparatus is not mounted on the Sand Pro in combination with the sled 10.

Figure 8:
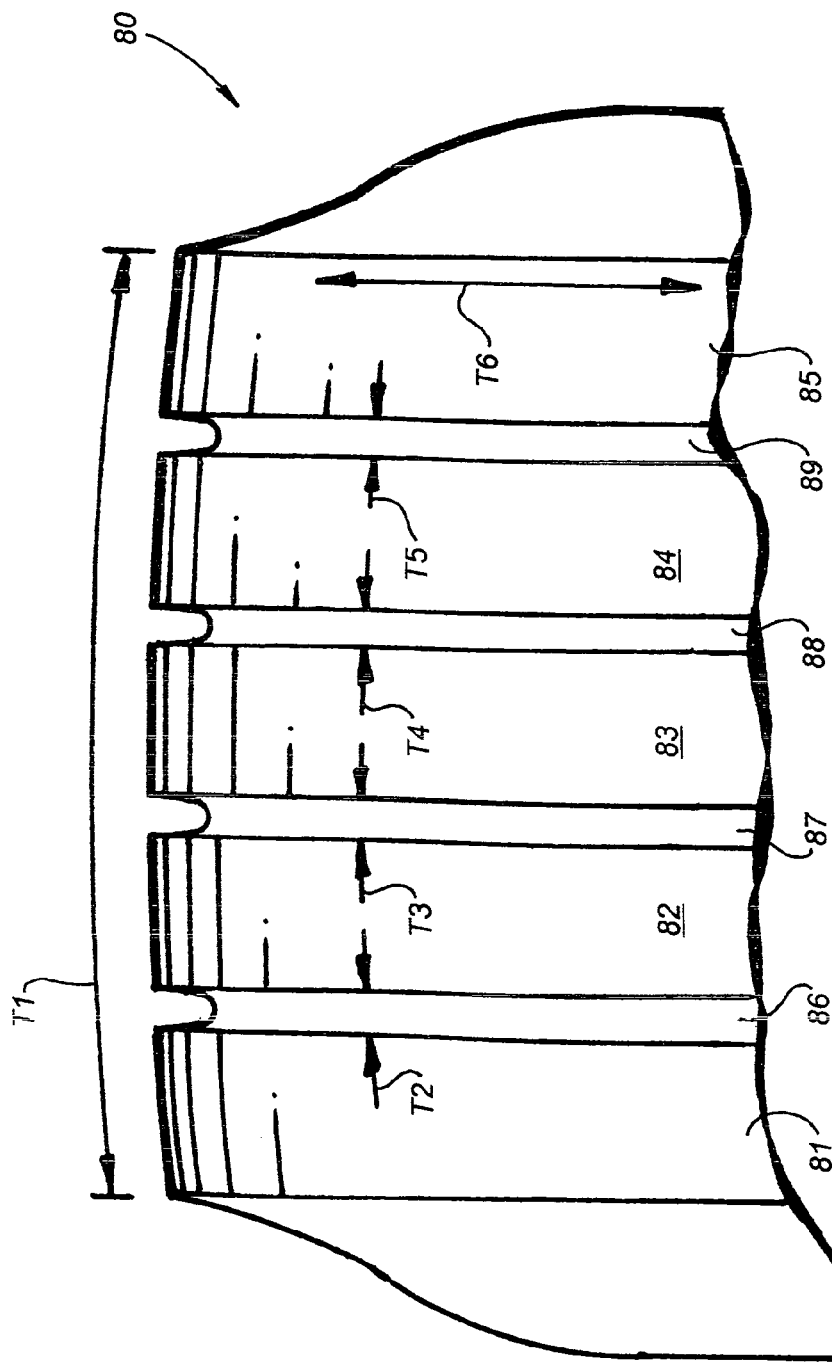
FIG. 8 is a side view of a tire of the type utilized an a prime mover in the system of the invention.

FIG. 8 illustrates a portion of a vehicle wheel 80 preferred in the practice of the invention. Wheel 80 does not have a tread which utilizes outwardly projecting spaced apart rounded dimples or "knobs". Such "knobby" treads have use in traversing a sand trap because the dimples penetrate and engage sand. During development of the invention, it was determined that this "penetration" function is at odds with one of the key invention objectives that was developed during production of the invention; namely, preventing the formation by the prime mover of detents in the surface of a green from which soil cores have been removed. The lateral distance across the peripheral tire tread surface in FIG. 8 is indicated by arrows T1. At least 50%, preferably at least 70%, most preferably at least 80% of this lateral distance T1 comprises relatively flat surface area which contacts and distributes the weight of prime mover 70 over surface of a green. Conversely, less than 50%, preferably less than 30%, and most preferably less than 20% of this lateral distance T1 comprises the width, indicated by arrows T2 and T3 and T4 and T5, of grooves which do not contact and distribute the weight of prime mover 70 over the surface of a golf green.

The tread in FIG. 8 includes five peripheral strips 81 to 85 which each extend around the outer circumference of tire 80. At least 50%, preferably at least 70%, most preferably at least 80% of each strip comprises arcuate surface area (having a radius generally equal to the radius of the tire) which will, when the tire rotates over the surface of a green, contact and distribute the weight of prime mover 70 over the surface of the green. Conversely, less than 50%, preferably less than 30%, and most preferably less than 20% of each strip comprises a groove or detent which does not contact and distribute the weight of primer mover 70 over the surface of a golf green when the prime mover is traveling over the surface of the green.

The combination of the weight of prime mover 70 and the tread design on the ground-contacting tires 80 of the prime mover should cause the tires to produce less than 100 psi, preferably less than 75 psi, more preferably less than 20 psi, and most preferably less than 10 psi when the prime mover 70 is pulling a deployed sled 10 over the surface of a green. In the presently preferred embodiment of the invention utilizing a Sand Pro™ prime mover weighing 930 pounds, less than five psi of pressure are produced on a green by the tires of the Sand Pro when the Sand Pro moves over the surface of the green. Consequently, in this presently preferred embodiment of the invention, less than five psi of pressure are produced on the surface of a green by the tires of the prime mover.

When a Sand Pro or other prime mover 70 is adapted to pull and lift a soil core collector sled 10 in accordance with the invention, it may be necessary to retrofit an existing hydraulic system with a larger hydraulic cylinder capable of lifting sled 10. In one embodiment of the invention, a Sand Pro prime mover 70 is modified by replacing a one and five-eighths diameter hydraulic cylinder with a two inch diameter hydraulic cylinder.

The greens on a golf course are periodically aerated by forming spaced apart cylindrical openings extending downwardly from the surface of the green. These cylindrical openings are then filled with sand. The cylindrical openings are formed by removing "cores" from the green. A "core" is a one-half to five-eighths inch diameter cylindrical plug which is typically four to seven inches long and is extracted from a green by punching a hollow cylindrical extractor bit into the green and then extracting the bit and core contained in the bit. When the extractor bit is forced into the surface of a green and is then extracted from the green, the bit pulls a cylindrical core out of the green. The core consists of dirt, grass, and grass roots. After the extractor bit is extracted from the green, the core is released on the surface of the green by the bit. When a green is cored in this fashion, the piece of equipment utilized has at least one row of spaced apart extractor bits, so that multiple cores are extracted from the green at the same time. The extracted cores which are scattered over the green surface are then removed from the green, either with a core gathering piece of equipment or by a group of workers that removed the cores with hand tools. The core gathering piece of equipment, when used, tends to drag core material over and "bridge" or seal ten to twenty percent of the cylindrical openings formed in the green. In the system of the invention, one important practice is to allow extracted cores to dry before a soil core collection sled 10 is utilized. It has been discovered that this practice greatly minimizes the proportion of cylindrical openings which are plugged by the sled 10. By way of example, and not limitation, when the ambient temperature is 110 degrees F., typically fifteen to thirty minutes is allowed for extracted soil cores to dry before soil core collection sled 10 is utilized to pick up the cores. If the ambient temperature is 70 degrees F., one and one half to two hours may be allowed for extracted soil cores to dry before soil core collection sled 10 is utilized to gather the soil cores from the surface of a green.

In one embodiment of the invention a kit is provided for use in connection with a Sand Pro™ or other selected prime mover. The kit includes a sled 10, and can also include a hitch assembly 22 to connect the prime mover to the sled 10 to tow sled 10 over the surface of a green, include a hoist assembly to connect the prime mover to the sled 10 to lift upwardly sled 10 away from the surface of a green, include apparatus to modify—if necessary—the hydraulic system of the Sand Pro or other prime mover to be able to lift sled 10 to the stowed position of FIG. 7, and include tires to replace "knobby" tires on the Sand Pro or other prime mover. The apparatus to modify the hydraulic system may, if appropriate and desirable, include a larger hydraulic cylinder and linkage or cam assemblies that are part of the hydraulic system. In some cases, the hydraulic system of a prime mover may not need to be modified, and the original equipment tires on the prime mover may not need to be replaced. In the currently preferred embodiment of the invention which utilizes a Sand Pro™ prime mover, the OEM tires are replaced and the hydraulic cylinder is replaced with a larger cylinder to increase the lifting capacity of the Sand Pro. Similarly, it is possible that the hitch and hoist assemblies of the prime mover will not need to be modified, although based on past experience, it appears likely that in many cases the hitch and hoist assembly will have to be modified. The sled 10 currently utilized in the practice of the invention weighs about one hundred pounds, although the weight of the sled can vary as desired.

Sled 10 can, if desired, be utilized on the tees and fairways of a golf course. The size and configuration of sled 10 can, if desired, be modified to better adapt sled 10 to tees and fairways. For example, the size and width of sled 10 can be increased such that the area covered by sled 10 is increased.

FIGS. 9 to 14 illustrate a sled and hitch assembly utilized in an alternate embodiment of the invention.

The hitch assembly includes yoke 123, upright member 114 pivotally connected by pin 142 to yoke 123, and horizontally oriented support assembly 118 fixedly connected to member 114.

Yoke 123 includes horizontally oriented panel member 122 and wings 124 and 125 which downwardly project from the ends of member 122 and each have an aperture 132 and 131, respectively, formed therein. Arms or other connecting elements extend from the prime mover 70 to wings 124 and 125 and are pivotally secured to wings 124 and 125 by pins which extend through apertures 132 and 133. Spaced apart flanges 128 upwardly depend from member 122. A rear, generally rectangular, vertically oriented panel member 122A extends downwardly from the back edge of member 122 and extends from one wing 124 to the other wing 125.

As noted, the lower end of member 114 is pivotally secured by pin 142 which extends through the lower end of member 114 and through upwardly depending flanges 128. The assembly 115 connected to the upper end of member 114 includes a pair of spaced apart connection flanges and a pin extending therethrough. The connection flanges are fixedly secured to the upper end of member 114 in the manner illustrated in FIG. 9. An arm or other auxiliary connecting element(s) extends from the prime mover to assembly 115 and is secured to assembly 115 by the pin extending through the connection flanges. Any other connecting configuration can be utilized in place of or in combination with assembly 115. If desired, the auxiliary connecting element(s) extending from the prime mover 70 to assembly 115 can include a supplemental hydraulic unit which can contract or expand to move assembly 115 (and therefore the top of member 114) toward or away from the prime mover. Such displacement of assembly 115 by the supplemental hydraulic unit would, as would be appreciated by those of skill in the art on reading the additional descriptions set forth below, therefore function to tilt arm 114 toward or away from prime mover 70, which would simultaneously (1) displace T-shaped support assembly 118 toward or away from the ground, (2) pivot box 100 about axis Z2, and (3) raise or lower upright panel member 113.

T-shaped support assembly 118 includes members 116 and 117 and a spring assembly. The spring assembly includes brackets 119, 119A and other components and is described in more detail below. One end of horizontally oriented elongate member 116 is fixedly secured to member 114. The other end of member 116 is fixedly secured to elongate member 117. A flange is fixedly secured to each end of member 117. Each flange has an aperture 135 formed therethrough.

The construction of soil collector sled 100 is generally equivalent to that of sled 10. Sled 100 includes a housing having a pair of spaced apart parallel upright sides 111 and 112, a front generally horizontally oriented panel member 140 which extends between and is generally perpendicular to sides 111 and 112, and, a rear upright panel member 113 which is generally parallel to the front panel member 140 and is generally perpendicular to sides 111 and 112. Connector members 136, 137 are fixedly attached to and upwardly depend from the upper edge of member 113.

A plurality of contiguous linked shovels 120, 121 extends between sides 111 and 112 and are each shaped and dimensioned to contact and slide over the surface of a golf course green. Each of shovels 120, 121 includes—in a manner comparable to shovels 18 to 21—a leading edge portion shaped and dimensioned to lie, when the shovel sets on the surface of the green, flat on the surface of the green. The leading edge portion includes a leading edge with a squared off surface canted with respect to the surface of the green when the shovel sets on the surface of the green. If desired the leading edge portion need not be squared off and can instead comprise a sharp edge more comparable to a knife edge. Each of the shovels also includes a trailing portion which is connected to the leading portion and is shaped and dimensioned to cant, when the shovel sets on the surface of the green, upwardly away from the leading portion and the surface of the green at an angle of less than nine degrees.

Pivot sleeve assembly 141 interconnects connects panels 122A of yoke 123 and panel 140 of sled 100. Assembly 141 includes a hollow cylindrical member, one end of which is fixedly secured to panel 122A. A cylindrical pin rotatably extends into hollow cylindrical member. One end of the pin is fixedly secured to panel 140. This permits the cylindrical pin to rotate freely in the fixed hollow cylindrical member and, consequently, permits sled 100 to pivot with respect to yoke 123 about horizontally oriented axis X2 in the manner indicated by arrows W3 in FIG. 9. Axis X2 coincides with the horizontally oriented centerline of the hollow cylindrical member—pin which comprise assembly 141.

Figure 9:
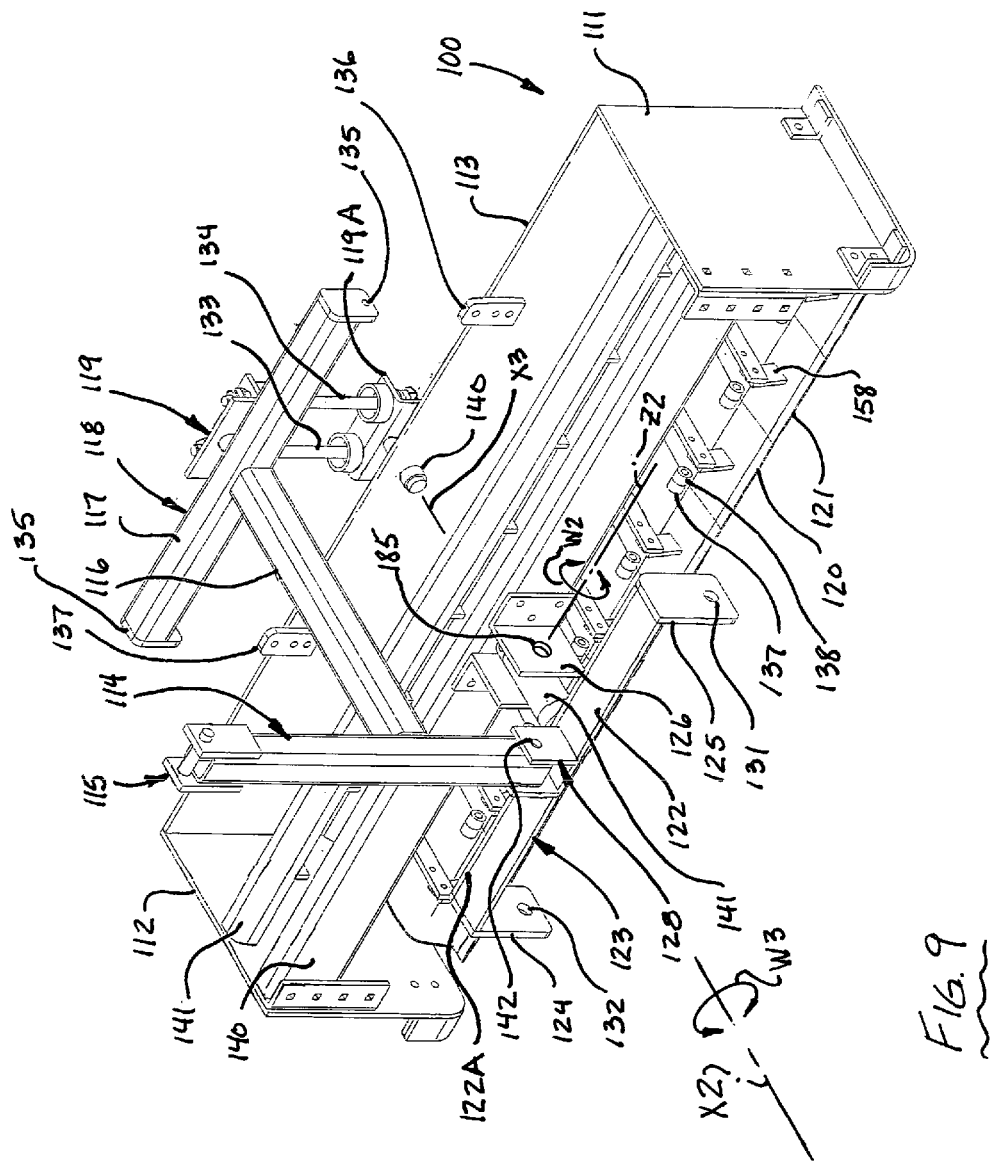
FIG. 9 is a perspective view illustrating a sled and hitch assembly utilized in an alternate embodiment of the invention.
Figure 10:
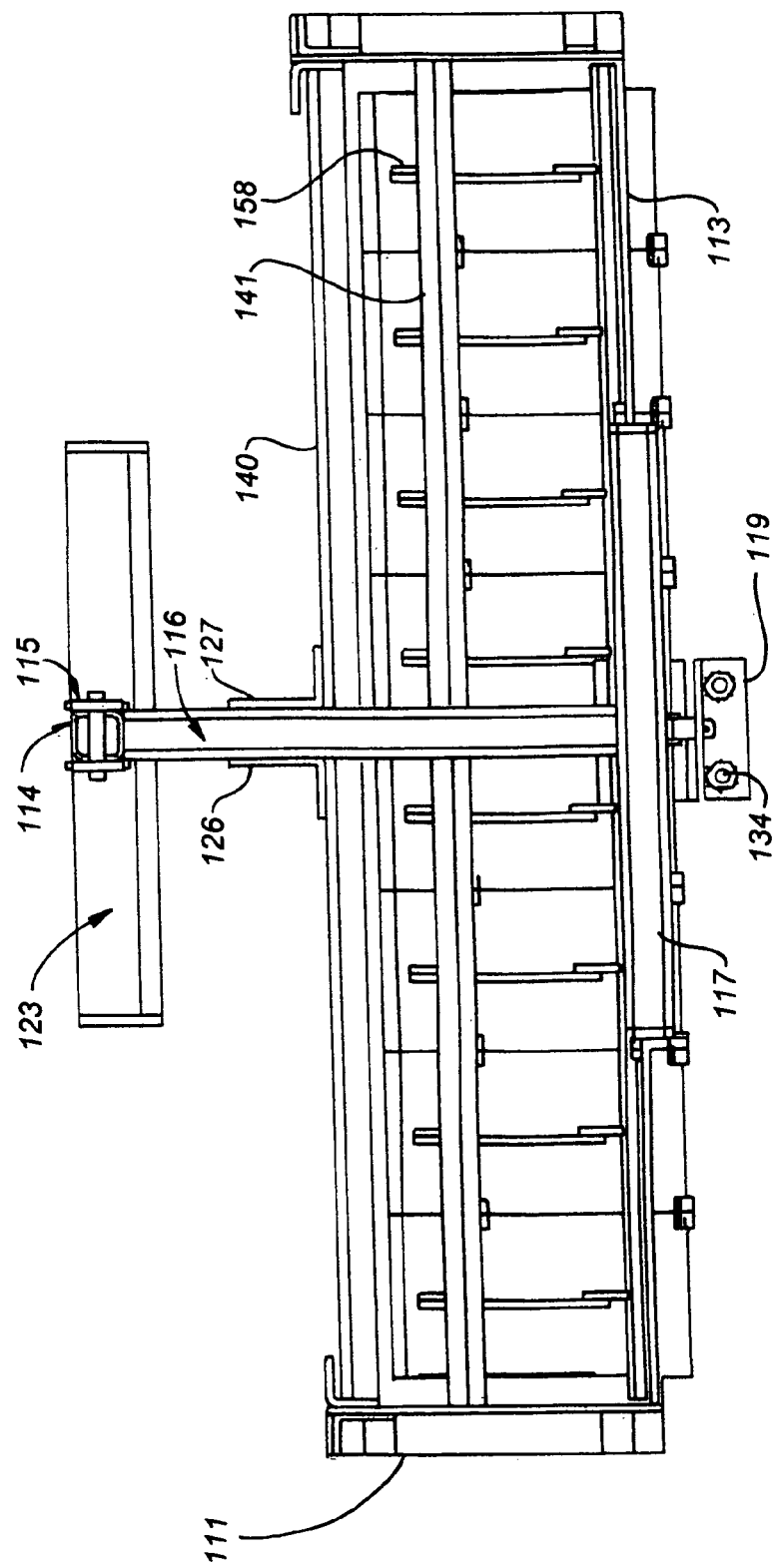
FIG. 10 is a top view further illustrating the sled and hitch assembly of FIG. 9.
Figure 11:
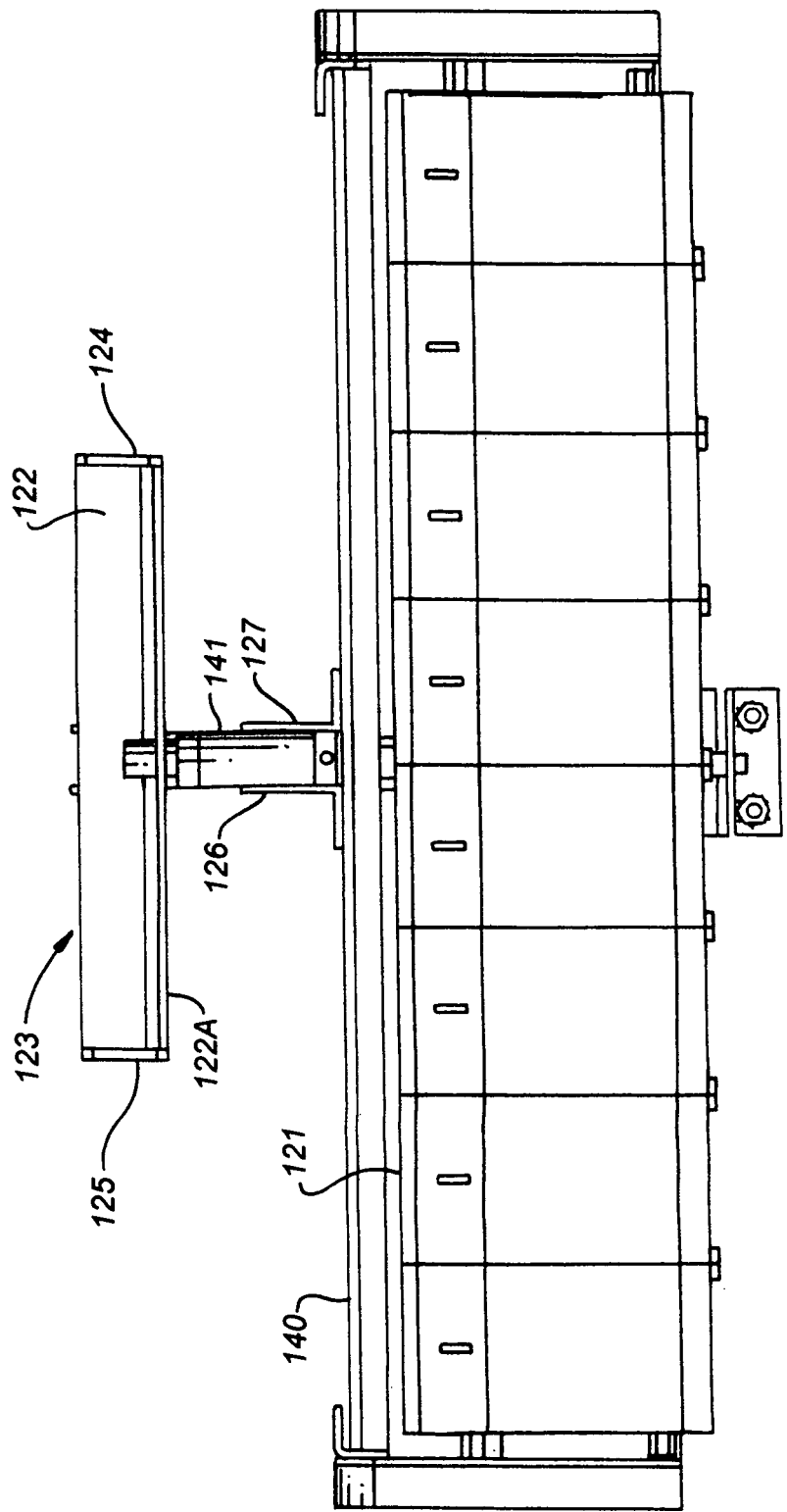
FIG. 11 is a bottom view further illustrating the sled and hitch assembly of FIG. 9.
Figure 12:
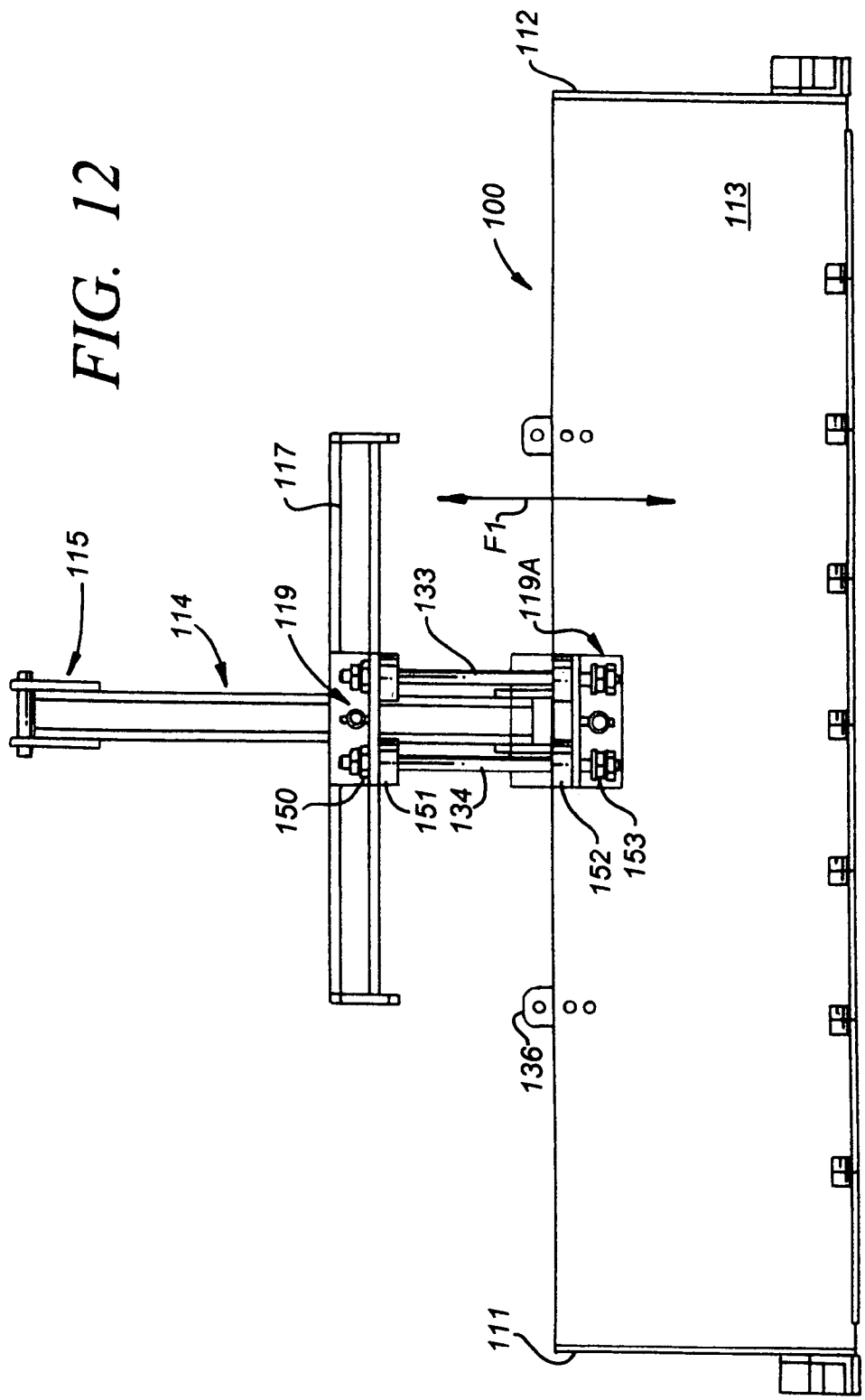
FIG. 12 is a rear view further illustrating the sled and hitch assembly of FIG. 9.
Figure 13:
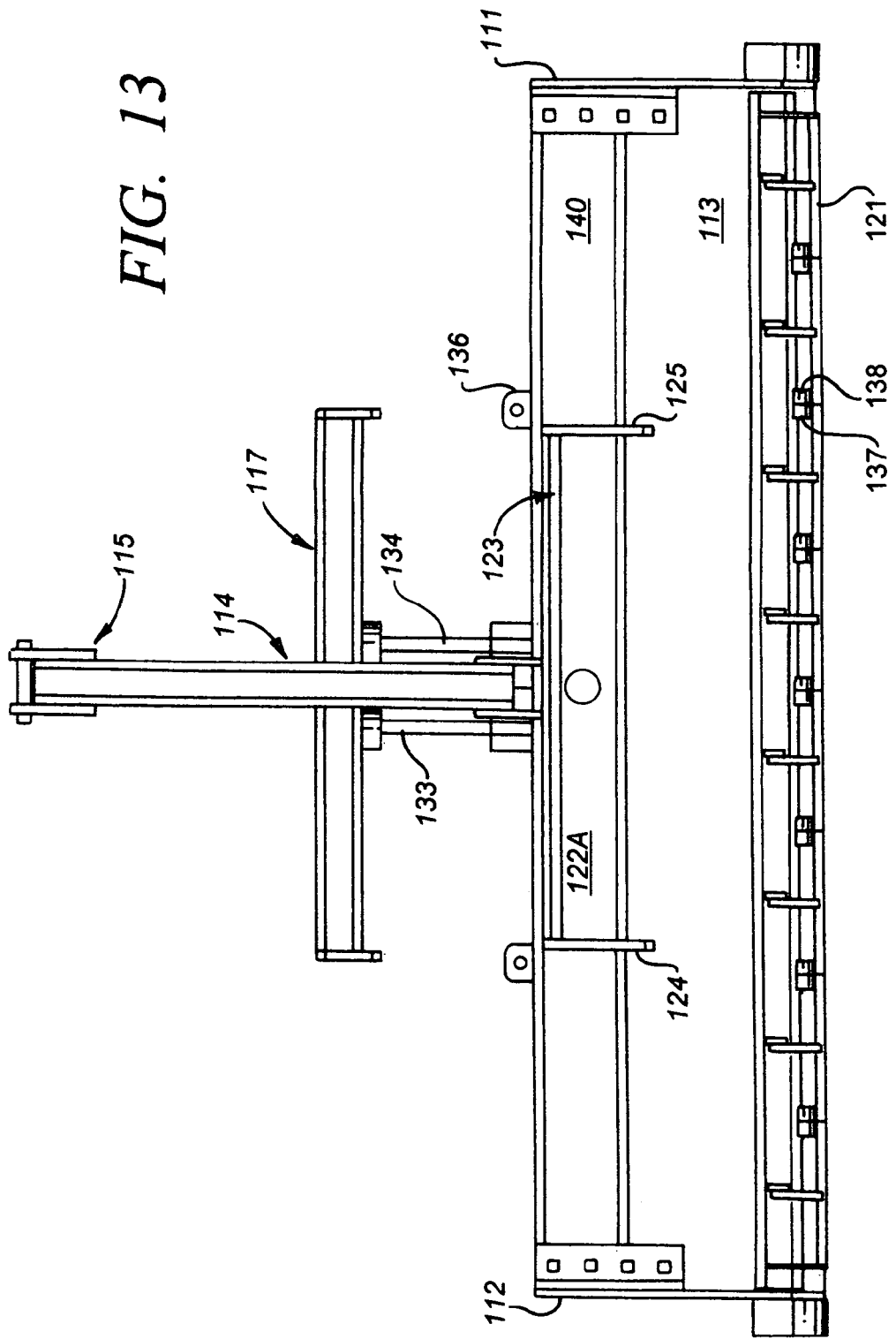
FIG. 13 is a front view further illustrating the sled and hitch assembly of FIG. 9; and, FIG. 14 is a side view further illustrating the sled and hitch assembly of FIG. 9.

A pair of spaced apart flanges 126, 127 are fixedly secured to panel 140 and extend outwardly therefrom, each flange extending, as can be seen in FIG. 9, along an opposite side of the hollow cylindrical member comprising a part of assembly 141. Each flange 126, 127 has an aperture 185 formed therethrough. A pivot pin is inserted in each aperture 185 and the end of the pin adjacent the hollow cylindrical member of assembly 141 is welded or otherwise fixedly secured to said hollow cylindrical member. This permits apertures 185 each to freely pivot about an operatively associated pivot pin which is fixedly secured to the exterior of the fixed hollow cylindrical member of assembly 141, and, therefore to pivot about axis Z2 in the manner indicated by arrows W2 in FIG. 9. Axis Z2 coincides with the centerline passing through both apertures 185—one of said apertures being in flange 126, the other in flange 127. Axis Z2 is generally parallel to panel 122A and to panel member 113; and, is generally perpendicular to axis X2.

A first chain (not shown) comparable to chain 16 in FIG. 1 (or cables or other connecting means) interconnects the right hand flange 135 in FIG. 9 with connector member 136. A second chain (not shown) comparable to chain 15 in FIG. 1 interconnects the left hand flange 135 in FIG. 9 with connector member 137.

Member 117 and member 113 of sled 100 are interconnected by a spring assembly. The spring assembly functions to generate a downwardly acting force which displaces member 113 and sled 100 toward the ground. The spring assembly includes L-shaped bracket 119 pivotally mounted on member 117, and, includes L-shaped bracket 119A pivotally mounted on member 113 by sleeve assembly 140. The axis of rotation, X3, of bracket 119A about sleeve 140 normally is co-linear with axis X2, but this need not be the case. At least a pair of rods 133, 134 extend between brackets 119 and 119A in the manner illustrated in FIG. 12. The bottom end of each rod 133, 134 extends through and a selected distance downwardly past the hollow horizontally oriented "leg" of bracket 119A in the manner shown in FIG. 12. The distance that the bottom end of each rod 133, 134 extends downwardly past the horizontally oriented leg of bracket 119A provides "play" and permits spring mounted on rods 133 and 134 to displace downwardly bracket 119A to increase the distance between brackets 119 and 119A, and, to increase the distance between sled 100 and member 117 when sled 100 is being pulled by prime mover 70 over an undulating surface.

Figure 14:
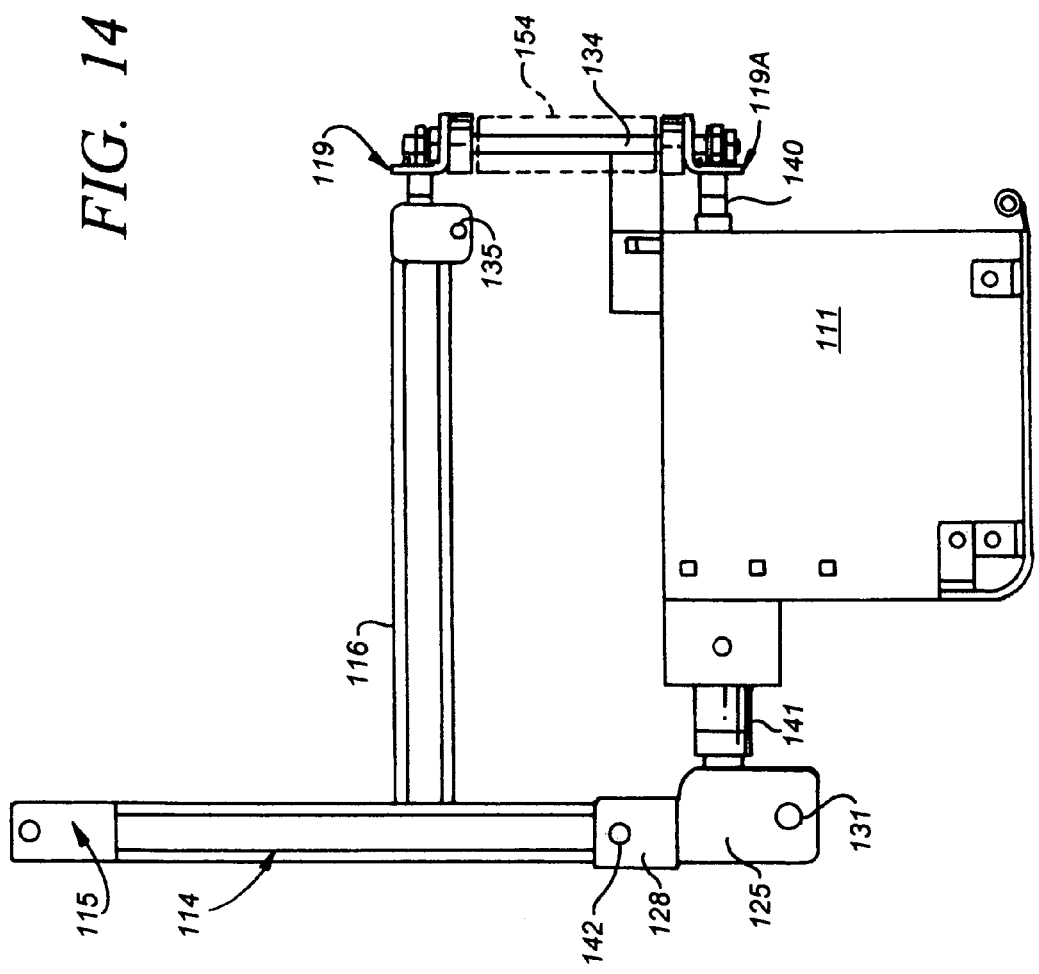

A hollow cylindrical spiral or helical spring, as indicated by dashed lines 154 in FIG. 14, is mounted on and circumscribes each rod 133 and 134. The spring 154 mounted on and circumscribing rod 134 extends between hollow cups 151 and 152. The upper end of spring 154 seats, is housed in, and is confined in cup 151, The lower end of spring 154 seats, is housed in, and is confined in cup 152. A second hollow cylindrical spiral or helical spring is mounted on and circumscribes rod 133 in a fashion similar to that of spring 154. When a spring 154 is initially installed on rod 133 or 134 and extends between a pair of cups 151 and 152, the spring is compressed (i.e., "pre-tensioned") a selected amount from its normal at rest orientation. Consequently, the spring 154 is, for example, attempting to expand and to force cups 151 and 152 apart. When sled 100 is resting on a normal flat surface, the forces generated by the springs mounted on rods 133 and 134 are not sufficient to force upwardly T-shaped support assembly 118 upwardly along with member 114 and yoke 123. Accordingly, the forces generated by the springs 154 act to push member 113 and the rear of sled 100 against the ground. Springs 154 are selected which generate the desired amount of "downward" force acting against member 113. A single spring can be utilized instead of a pair of springs. A pair of springs (or three or more springs) mounted to either side of sleeve assembly 140 is, however, presently desired in the practice of the invention because in this configuration the springs function to control and minimize tilting and rotation of sled 100 in the direction of arrows W about axes X2 and X3.

Downwardly extending flanges 124 and 125 are desired in the practice of the invention because they lower the points at which prime mover 70 pulls sled 100. If apertures 131 and 132 are positioned too far above the ground, then the pulling force generated on sled 100 by prime mover 70 can tend to force the back of the sled to tilt upwardly and, as a result, force the leading edges of shovels 120 and 121 to dig into the ground.

Operation of sled 100 generally corresponds to the operation protocol discussed with respect to sled 100. Sled 100 has a first deployed operative position with the shovels 120, 121 set on the surface of a golf green or other desired surface such that prime mover 70 can pull sled 100 over the surface of the green to collect soil cores. The second operative position of sled 100 consists of the sled being raised upwardly away from the surface of the green.

During operation of the hitch assembly and sled 100 of FIG. 9, the yoke 123, member 114, and T-shaped support assembly 118 tend to remain in fixed position. This is the case even though yoke 123 could pivot at apertures 131, 132 as previously described, and, member 114 could pivot about pin 142 as previously described. The arm or assembly connecting the top of member 114 to prime mover 70 can, as noted earlier, be constructed as a hydraulic arm or other adjustable arm such that the position of the upper end of member 114 can be adjusted toward or away from prime mover 70. Such an adjustment would be another way to control the tilt and orientation of sled 100 by moving member 113 and the rear of the sled 100 up or down, as the case might be. Currently, however, the following configuration is presently preferred. Namely, during operation of the apparatus of FIGS. 9 to 14, member 114 remains in a generally fixed vertically oriented position similar to that illustrated in FIG. 9, T-shaped support assembly 118 tends to remain in a generally fixed horizontally oriented position similar to that illustrated in FIG. 9, and sled 100 is mounted on the hitch assembly with springs which produce a desired downward force on member 113. In this configuration, when prime mover 70 and the hitch assembly pull sled 100 over a golf course green or other desired surface, sled 100 tilts about axes X2, X3 and Z2 while the hitch assembly remains relatively fixed. One reason this preferred configuration is believed to function effectively is that the springs 154 mounted on 133 and 134 control the rear of sled 100 and prevent an undue amount of upward displacement of member 113 and the rear of sled 100 from occurring.

Having set forth my invention in terms to enable those skilled in the art to understand and practice the invention and having set forth the presently preferred embodiments and uses thereof, I claim:

1. A method to collect soil cores from the surface of a golf green, comprising the steps of
 (a) providing soil core collector apparatus including
  (i) a prime mover having
   a selected weight and at least three ground engaging tires, each of said tires having a selected tread diameter, width, and ground contact area such that said prime mover generates less than two hundred psi on the golf green, and
   a top speed of at least five miles per hour,
  (ii) a soil core collector sled having
   a housing including
    a pair of spaced apart upright sides,
    a front generally horizontally oriented panel member extending between and generally perpendicular to said sides, and
    a rear upright panel member generally parallel to said front panel member and extending between and generally perpendicular to said sides,
   a plurality of contiguous linked shovels extending between said sides and shaped and dimensioned to contact and slide over the surface of the green, each of said shovels including
    a leading portion shaped and dimensioned to lie, when said shovel sets on the surface of the green, flat on the surface of the green, said leading portion including a leading edge with a surface canted with respect to the surface of the green when said shovel sets on the surface of the green, and
    a trailing portion connected to said leading portion and shaped and dimensioned to cant, when said shovel sets on the surface of the green, upwardly away from said leading portion and the surface of the green at an angle of less than nine degrees, and
  (iii) a hitch assembly interconnecting said prime mover and said soil collector sled and including
   a yoke (123) connected to said prime mover,
   a pivot sleeve (141) interconnecting said yoke and said front panel member (140) such that said sled can pivot with respect to said yoke about an axis (X2) generally perpendicular to said front panel,
   an upright member (114) connected to and upwardly depending from said yoke,
   a support member (118) connected to said upright member and extending over said sled,
   a spring assembly (133, 134, 154) interconnecting said support member (118) and said rear panel member of said sled to generate a force acting to displace said rear panel member downwardly toward the ground,
  said soil core collector sled having at least two operative positions on said prime mover,
   a first deployed operative position with said shovels set on the surface of the green such that said prime mover can pull said sled over the surface of the green to collect soil cores, and
   a second stowed position with said sled raised away from the surface of the green;
 (b) aerating the green by extracting soil cores from the green and leaving the extracted soil cores scattered on the surface of the green;
 (c) positioning said soil core collector sled in said first deployed operative position; and,
 (e) moving said prime mover and said soil core collector sled over the surface of the green to collect the extracted soil cores from the surface of the green.

* * * * *